US005175876A

United States Patent [19]

Villacis Mendoza

[11] Patent Number: 5,175,876

[45] Date of Patent: Dec. 29, 1992

[54] REMOTE CONTROLLER BAG

[76] Inventor: Miguel A. Villacis Mendoza, Casilla 6025, Guayaquil, Ecuador

[21] Appl. No.: 694,775

[22] Filed: May 2, 1991

[51] Int. Cl.[5] ........................ B65D 85/38; H04B 1/034

[52] U.S. Cl. ........................................ 455/92; 455/128; 206/328

[58] Field of Search ................. 455/92, 128, 347, 348; 383/63, 106; 206/305, 320, 328, 524.8; 248/205.2, 631; 269/22

[56] References Cited

U.S. PATENT DOCUMENTS 4,569,082 2/1986 Ainsworth et al. ................. 206/522
4,762,227 8/1988 Patterson ............................ 206/328
4,801,213 1/1989 Frey et al. ........................... 206/522
5,080,155 1/1992 Crozier ................................ 383/63

*Primary Examiner*—Reinhard J. Eisenzopf
*Assistant Examiner*—Nguyen Vo
*Attorney, Agent, or Firm*—Leon Gilden

[57] ABSTRACT

A remote controller bag is arranged for receiving a remote control unit therewith, wherein the bag is formed of a transparent and flexible material to permit operation and visibility of the controller button members. The organization optionally includes pneumatic chambers coextensive with each side wall of the organization to define a cavity therebetween, wherein the cavity further includes a floor member, wherein the floor member includes a plurality of tubular containers arranged parallel relative to one another defining pneumatic columns therebetween for accommodating impact to the controller unit.

6 Claims, 3 Drawing Sheets

REMOTE CONTROLLER BAG

BACKGROUND OF THE INVENTION

1. Field of the Invention

The field of invention relates to support housings, and more particularly pertains to a new and improved remote controller bag structure to accommodate impact to maintain a control unit in a sealed and secure environment.

2. Description of the Prior Art

Prior art structure of various types have been utilized to accommodate electronic equipment and the like to afford protection of such equipment. Such organizations of the prior art, however, have been typically of a rigid construction not suitable to accommodating housings of various configurations. The instant invention attempts to overcome deficiencies of the prior art by providing an organization to accommodate such variations and further provide impact resistance to such controller units. Examples of the prior art include U.S. Pat. No. 4,653,115 to Holcomb sets forth a battery kit structure wherein an upper and lower housing secure a battery pack therebetween, wherein the lower housings are interfitted to secure the battery member therebetween.

U.S. Pat. No. 4,905,127 to Kaminski sets forth a remote control illumination device to enhance illumination of a remote controller and for mounting thereto.

U.S. Pat. No. 4,768,230 to Viebrantz, et al. sets forth a housing for a controller unit formed of a rigid construction typical of the prior art organizations.

U.S. Pat. No. 4,574,285 to Bascou sets forth a remote control device including a pivoting case to provide access within the controller unit.

As such, it may be appreciated that there continues to be a need for a new and improved remote controller bag as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of remote controller devices now present in the prior art, the present invention provides a remote controller bag wherein the same provides pneumatic and fluid-filled chambers to afford impact resistance to a remote control unit, as well as affording access to use of the controller unit when positioned within the bag structure. As such, the general purpose of the present invention, which will be described subsequently in greater detail, is to provide a new and improved remote controller bag which has all the advantages of the prior art remote controller devices and none of the disadvantages.

To attain this, the present invention provides a remote controller bag arranged for receiving a remote control unit therewithin, wherein the bag is formed of a transparent and flexible material to permit operation and visibility of the controller button members. The organization optionally includes pneumatic chambers coextensive with each side wall of the organization to define a cavity therebetween, wherein the cavity further includes a floor member, wherein the floor member includes a plurality of tubular containers arranged parallel relative to one another defining pneumatic columns therebetween for accommodating impact to the controller unit.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved remote controller bag which has all the advantages of the prior art remote control apparatus and none of the disadvantages.

It is another object of the present invention to provide a new and improved remote controller bag which may be easily and efficiently manufactured and marketed.

It is a further object of the present invention to provide a new and improved remote controller bag which is of a durable and reliable construction.

An even further object of the present invention is to provide a new and improved remote controller bag which is susceptible of a low cost of manufacture with regard to both materials and labor, and which accordingly is then susceptible of low prices of sale to the consuming public, thereby making such remote controller bags economically available to the buying public.

Still yet another object of the present invention is to provide a new and improved remote controller bag which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
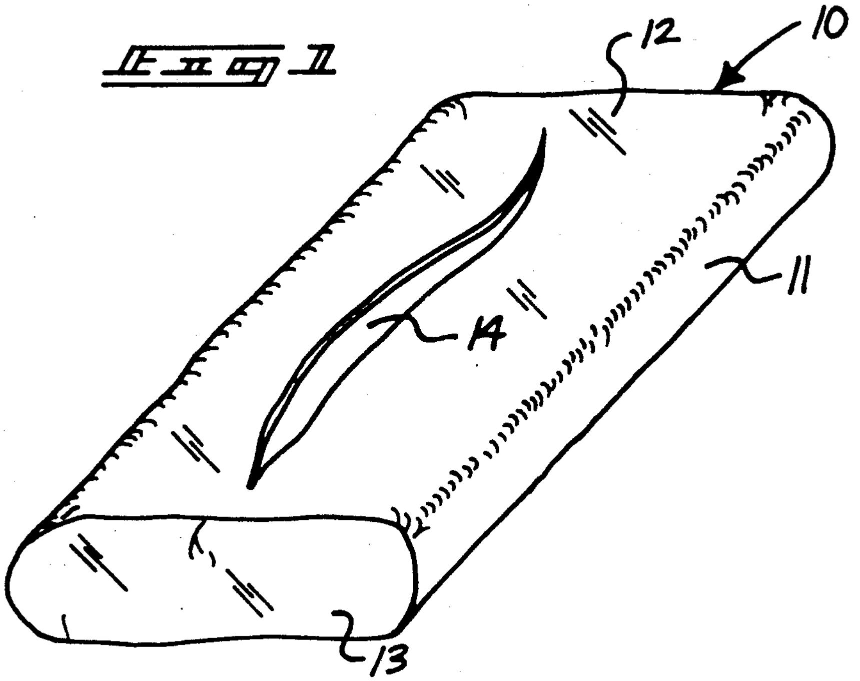
FIG. 1 is an isometric illustration of the instant invention.
Figure 2:
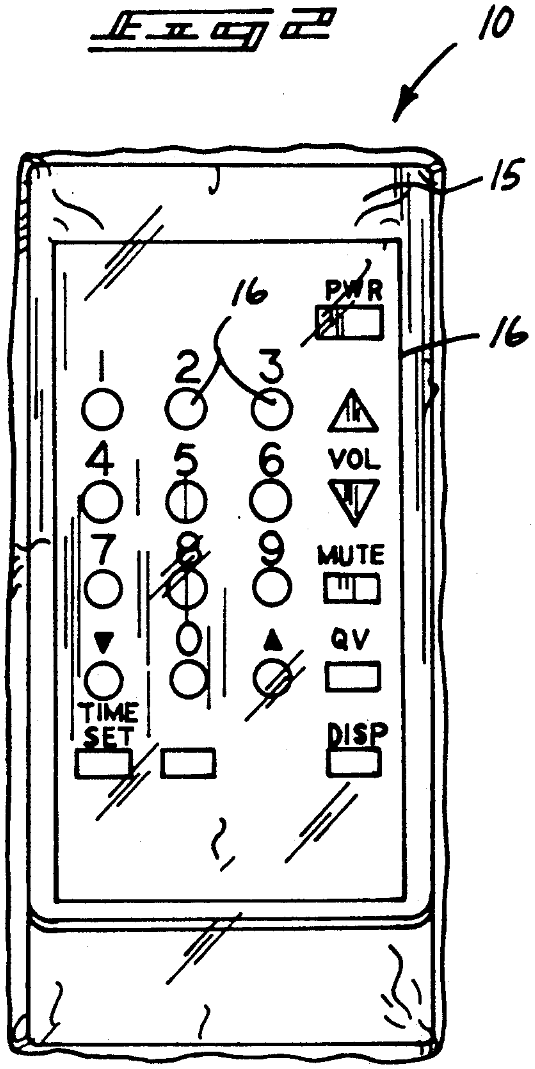
FIG. 2 is an orthographic top view of the instant invention securing a remote controller therewithin.

With reference now to the drawings, and in particular to FIGS. 1 to 6 thereof, a new and improved remote controller bag embodying the principles and concepts of the present invention and generally designated by the reference numerals 10 and 10*a* will be described.

More specifically, the remote controller bag 10 of the instant invention essentially comprises a flexible transparent bag member, including spaced side walls 11, a top wall 12, spaced end walls 13, with a slit 14 directed through the top wall 12 to receive a remote controller housing 16 within the bag structure defined by the top wall, end walls, side walls, and a bottom wall 15. The remote controller housing 16 is provided with control members 16*a* through a top face of the controller, wherein such control units are accessible through the transparent bottom wall 15 for ease of viewing and access in use.

Figure 3:
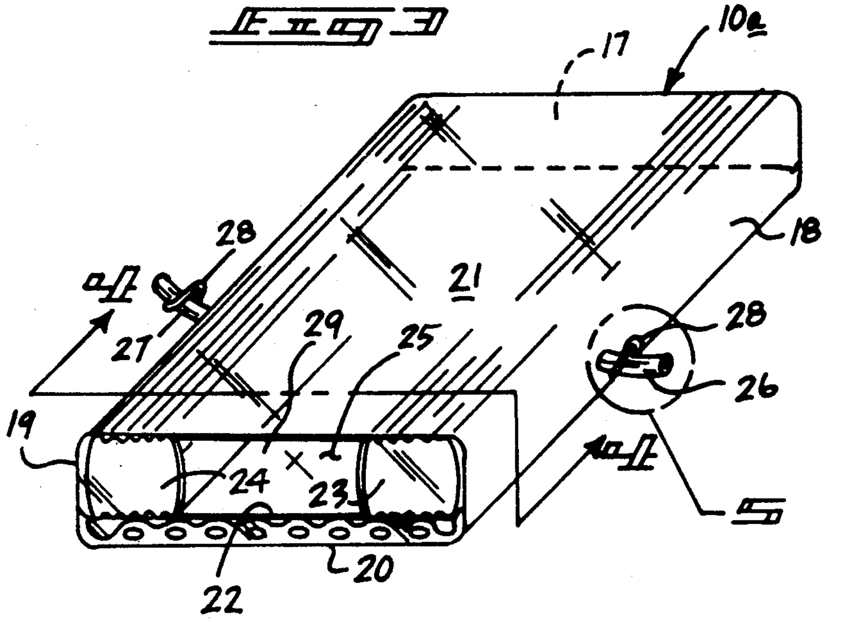
FIG. 3 is an isometric illustration of a modified aspect of the instant invention.
Figure 4:
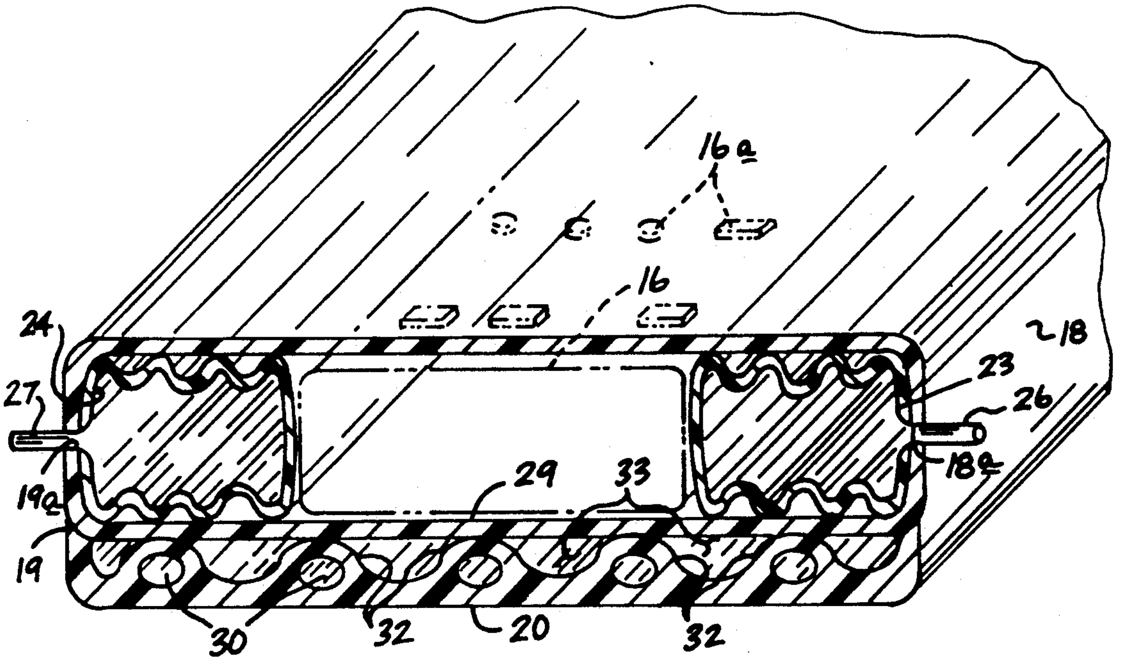
FIG. 4 is an orthographic view, taken along the lines 4—4 of FIG. 3 in the direction indicated by the arrows.
Figure 5:
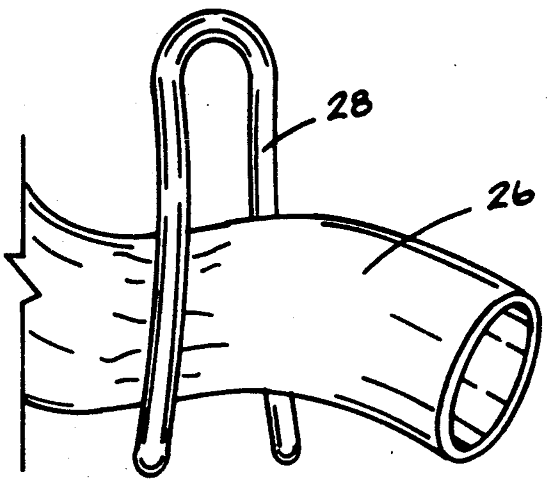
FIG. 5 is an isometric illustration of section 5, as set forth in FIG. 3.

FIGS. 3–6 illustrate the use of modified aspects of the invention, wherein the modified controller bag 10*a*, as illustrated in FIG. 3 for example, utilizes a rear end wall 17 orthogonally oriented relative to a right side wall 18 and a left side wall 19, as well as a top wall 21 and a bottom wall 20 defining a transparent bag structure to further include a front entrance opening 22 spaced from the rear end wall 17 to define a central cavity 25 to receive a remote controller housing 16 therewithin. A right pneumatic chamber 23 and a left pneumatic chamber 24 are mounted within the central cavity 25 adjacent to, contiguous with, and coextensive with the respective right and left side walls in communication with the top and bottom walls 21 and 20 respectively. Each pneumatic chamber includes an accordion pleated top and bottom chamber wall coextensive with the top and bottom walls. Further, each pneumatic chamber 23 and 24 respectively include a respective right and left inflation tube 26 and 27 directed through a respective right side wall aperture 18*a* and left side wall apertures 19*a* to secure and position the chambers in place as the associated inflation tubes 26 and 27 respectively are directed through the respective right and left wall apertures. Further, each inflation tube 26 and 27 includes a bifurcated locking clip 28 (see FIGS. 3 and 5 for example) to maintain inflation pressure within each chamber. It may be seen that the accordion pleating of each chamber permits positioning of each chamber into the central cavity 25 to impose upon sides of the controller housing 16, as illustrated in FIG. 4, to secure the controller in place within the transparent bag structure.

Figure 6:
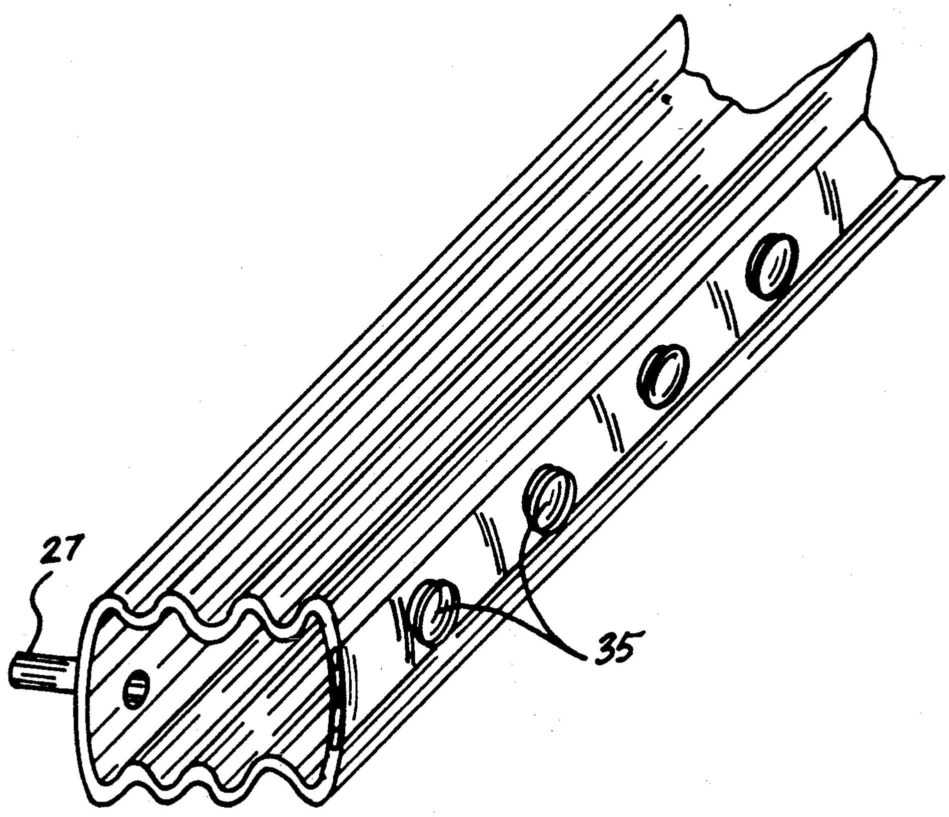
FIG. 6 is an isometric illustration of modified pneumatic chambers utilizing suction cups incorporated by the instant invention.

Further, the central cavity 25 is defined by a cavity floor 29 that is spaced above the bottom wall 20 of the bag structure, wherein positioned between the cavity floor 29 and the bottom wall 20 are a series of tubular filled containers 30 that are parallel to each other and spaced apart an equal spacing. These fluid filled containers are positioned within ribs 32 projecting from the bottom wall 20 to the bottom surface of the cavity floor 29 to define pneumatic columns 33 therebetween. These pneumatic columns accomodate flexure upon impact of the structure and further provide for protection to the controller housing contained therewithin. Reference to FIG. 6 illustrates the use of optional suction cup members 35 mounted on each interior side wall of each pneumatic chamber 23 and 24. The suction cup members 35 project within the cavity 25 where they are in confronting relationship relative to one another of opposed chambers to enhance securement of the controller housing within the cavity 25.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A remote controller bag in combination with a remote controller, wherein the bag includes a rear end wall, a right side wall, a left side wall, a bottom wall, and a top wall, wherein at least the top wall is formed of a transparent material, and including a front entrance opening between the right side wall, left side wall, bottom wall, and top wall in a spaced relationship relative to the rear end wall to receive the remote controller housing therewithin, wherein the remote controller housing includes a plurality of control members projecting through the remote controller housing adjacent the top wall when the remote controller housing is positioned within the remote controller bag to provide visual and manual access to the control members, and further including a cavity floor spaced above the bottom wall coextensive with the bottom wall and positioned under the top wall to define a central cavity between the cavity floor and the top wall to receive the remote control housing within the central cavity, and a right pneumatic chamber positioned within the central cavity adjacent to and in contiguous communication with the right side wall, and a left pneumatic chamber in contiguous communication with and coextensive with the left side wall, wherein the right pneumatic chamber and the left pneumatic chamber are mounted between the top wall and the cavity floor, and the right side wall includes a right side wall aperture, and the left side wall includes a left side wall aperture, wherein the right pneumatic chamber includes a right inflation tube in pneumatic communication with the right pneumatic chamber projecting through the right side wall aperture, and the left pneumatic chamber includes a left inflation tube in pneumatic communication with the left pneumatic chamber projecting through the left side wall aperture.

2. An apparatus as set forth in claim 1 wherein each inflation tube includes a bifurcated locking clip secured about each inflation tube.

3. An apparatus as set forth in claim 2 wherein the right pneumatic chamber and the left pneumatic chamber each include an accordion pleated top and bottom chamber wall coextensive with and in contiguous communication with the respective top wall and cavity floor to permit expansion of each pneumatic chamber within the central cavity to secure the remote controller housing therebetween within the central cavity.

4. An apparatus as set forth in claim 3 wherein a plurality of equally spaced parallel ribs are formed between the cavity floor and the bottom wall coextensive with the cavity floor and bottom wall, wherein each rib surroundingly includes a tubular fluid filled container therewithin to accommodate impact to the remote controller housing.

5. An apparatus as set forth in claim 4 further including a pneumatic column defined coextensively between adjacent ribs of the plurality of ribs.

6. An apparatus as set forth in claim 5 wherein each pneumatic chamber includes an interior wall in confronting relationship relative to the remote controller housing, and each interior wall includes a series of suction cup members mounted thereon to enhance securement of the remote controller housing within the central cavity.

* * * * *